United States Patent [19]

Connell

[11] 4,201,326
[45] May 6, 1980

[54] PIVOTAL BACK-UP PADS FOR WELDING

[75] Inventor: Talbert D. Connell, Spring, Tex.

[73] Assignee: Crutcher Resources Corporation, Houston, Tex.

[21] Appl. No.: 926,024

[22] Filed: Jul. 19, 1978

Related U.S. Application Data

[63] Continuation-in-part of Ser. No. 892,945, Apr. 3, 1978, Pat. No. 4,165,831.

[51] Int. Cl.$^2$ ............................................... B23K 5/22
[52] U.S. Cl. .................................... 228/50; 219/160; 228/49.13
[58] Field of Search .................. 228/50, 46, 49.13; 219/285, 160, 158, 161

[56] References Cited

U.S. PATENT DOCUMENTS

| | | | |
|---|---|---|---|
| 2,331,689 | 10/1943 | Hodge | 219/160 |
| 2,331,937 | 10/1943 | Schreiner | 228/50 |
| 2,448,107 | 8/1948 | Mattimore | 219/160 |
| 2,472,523 | 6/1949 | Dillon | 228/50 |
| 2,792,626 | 5/1957 | Chyle | 228/50 |
| 2,878,770 | 3/1959 | Work | 228/50 |
| 2,878,972 | 5/1959 | Handley | 228/50 |
| 2,952,231 | 9/1960 | Chyle | 228/50 |
| 2,987,022 | 6/1961 | Thielsch | 228/50 |
| 3,110,277 | 11/1963 | Dixon | 228/50 |
| 3,185,369 | 5/1965 | Patton | 228/50 |
| 3,207,503 | 9/1965 | Clover | 228/50 |
| 3,229,884 | 1/1966 | Franklin | 228/50 |
| 3,458,105 | 7/1969 | Valentine | 228/50 |
| 3,561,320 | 2/1971 | Nelson | 228/213 |
| 3,604,612 | 9/1971 | Miller | 228/29 |
| 3,741,457 | 6/1973 | Gwin | 228/50 |
| 3,777,114 | 12/1973 | Reynolds | 219/160 |
| 3,806,694 | 4/1974 | Nelson | 228/27 |
| 3,940,048 | 2/1976 | Casey | 228/50 |

FOREIGN PATENT DOCUMENTS 423595 10/1974 U.S.S.R. .................................... 228/50

Primary Examiner—Francis S. Husar
Assistant Examiner—Gene P. Crosby
Attorney, Agent, or Firm—Richards, Harris & Medlock

[57] ABSTRACT

An improved back-up pad apparatus for use in externally welding abutting ends of pipe comprises a plurality of arcuate back-up pads positioned to face the interior of the weld. Each arcuate pad is mounted on a support shoe for radial movement into and out of biased engagement with the interior cylindrical surfaces of the pipes. The arcuate pads are pivotally supported by the support shoes and biased about axes parallel with the centerline of the pipe to permit retraction of the pads without interference. Preferably, the pads are constructed of hard anodized aluminum material.

11 Claims, 8 Drawing Figures

PIVOTAL BACK-UP PADS FOR WELDING

CROSS-REFERENCE TO RELATED APPLICATION

This application is a continuation-in-part of co-pending application Ser. No. 892,945 filed Apr. 3, 1978 now U.S. Pat. No. 4,165,831 issued Aug. 28, 1979.

BACKGROUND AND SUMARY OF THE INVENTION

This invention relates generally to the art of welding, and more particularly to a system having an improved back-up pad apparatus for use in welding together the ends of pipes.

The construction of a pipeline involves the joinder of numerous lengths of pipe. Each successive length of pipe is positioned end to end with respect to the preceding length of pipe. The ends of the pipes are then secured by welding. In such welding operations, a strip of material known as a back-up pad is typically applied to the surfaces of the pipes to be joined. The pad faces the line of the weld on the side opposite to that from which the welding operation is to be performed. The use of a back-up pad supports the molten weld material during the weld operation. Formation of irregularities at the joints which could interfere with fluid flow through the pipeline is prevented in this manner. More importantly, the use of a back-up pad results in a more structurally reliable weld. It will be appreciated that back-up pads must be constructed of a durable material to withstand the elevated temperatures which accompany a welding operation.

The prior art contains numerous examples of back-up pads for use in a welding operation. The prior art approaches include utilization of various materials in conjunction with differing designs. For example, back-up pads formed of copper material have been used. One problem involved in using copper back-up pads is that melted copper can become mingled with the welding material or the molten pipe metal, resulting in a weak weld and possible failure of the joint. Another problem is the relatively short useful life of copper back-up pads. Other materials have also been utilized for back-up pads but suffer from similar disadvantages. Heretofore there has not been available a back-up pad capable of extended useage in providing strong uniform welds. There is thus a need for an improved back-up pad apparatus for use in the construction of a pipeline wherein each weld joint is critical.

The present invention comprises an improved back-up pad apparatus which overcomes the foregoing problems and other difficulties associated with the prior art. In accordance with the broader aspects of the invention, there is provided a back-up pad apparatus exhibiting improved performance characteristics over the teaching of the prior art. Each arcuate back-up pad is formed of a hard anodized aluminum material and is capable of multiple useage. Use of the back-up pad of the present invention results in strong and reliable welds between each length of pipe in a pipeline.

According to more specific aspects of the invention, an improved back-up pad apparatus comprises a plurality of arcuate back-up pads mounted on supporting shoes. A groove is provided in the periphery of each back-up pad. The back-up pads include rounded ends and are formed of hard anodized aluminum. Each back-up pad is centrally supported by a support shoe for biased engagement against the interior cylindrical surfaces of two lengths of pipe to be welded. In one embodiment of the invention, cylindrically surfaced members carried by intermediate support shoes are provided between the rounded ends of adjacent back-up pads. The support shoes are slidably mounted on the actuator rods of pipe clamping shoes for radial movement therewith. In another embodient, each back-up pad is pivotally mounted on one support shoe and biased about an axis substantially parallel with the centerline of the pipe.

DESCRIPTION OF THE DRAWINGS

A more complete understanding of the invention can be had by reference to the following detailed description in conjunction with the accompanying drawings, wherein.

DETAILED DESCRIPTION

Figure 1:
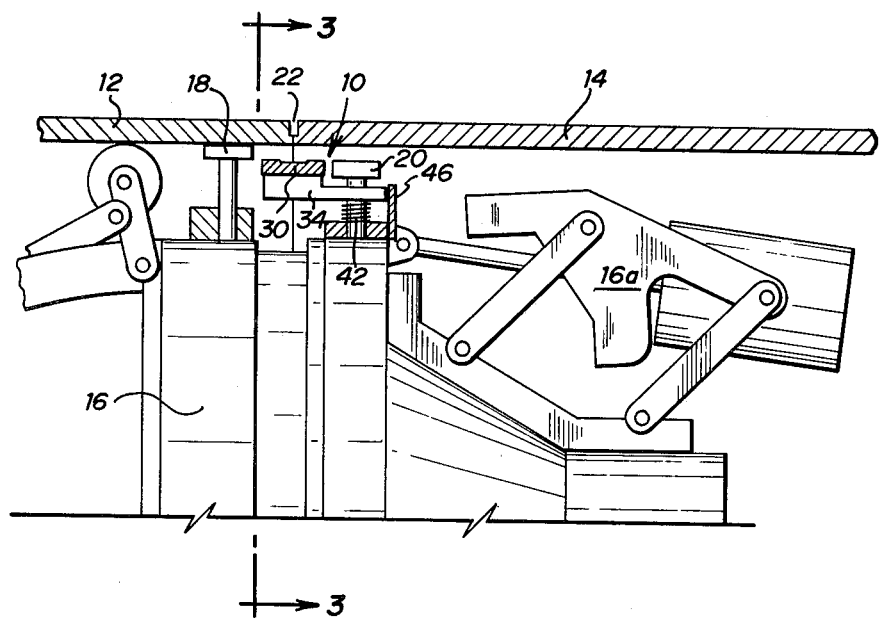
FIG. 1 is a partial vertical section view showing an improved back-up pad apparatus incorporating one embodiment of the invention installed for use with a pipe aligning/clamping mechanism.

In the drawings, like reference numerals designate like or corresponding parts throughout the several views. Referring to FIG. 1 there is shown an improved back-up pad apparatus 10 incorporating a first embodiment of the invention. The back-up pad apparatus 10 is utilized in the operation of welding pipes 12 and 14 in end to end relationship. Use of a back-up pad apparatus 10 results in a reliable and strong girth weld between pipes 12 and 14.

The back-up pad apparatus 10 is mounted on a pipe aligning/clamping mechanism 16 such as that described in U.S. Pat. No. 3,561,320 issued Feb. 9, 1971, the disclosure of which is hereby incorporated by reference. Although only a portion of the clamping system is shown herein, it is fully shown and described in said patent. The aligning/clamping mechanism 16 is adapted to firmly grip two lengths of pipe in proper relative positions for welding. The mechanism 16 travels inside the pipeline comprising pipes 12 and 14. Mechanism 16 contains actuators, such as double-acting cylinders, for moving toggle elements (not shown) which in turn move groups of circumferentially spaced pipe clamp shoes 18 and 20. Clamp shoes 18 and 20 are selectively moved into and out of engagement with the inside surfaces of pipes 12 and 14, respectively, by hydraulic means not shown. Clamp shoes 18 and 20 are affixed to the ends of piston rods 38 slidable with respect to a portion of the housing of mechanism 16. After mechanism 16 is properly positioned in relation to the end of pipe 12 by actuation of toggle system 16a clamp shoes 18 are actuated outwardly to lock mechanism 16 in place. Pipe 14 is then moved into abutting relationship with the end of pipe 12, forming joint 22, whereupon clamp shoes 20 are actuated outwardly to lock the pipes in fixed positions and to hold them thus clamped during welding at joint 22. After completion of the weld, mechanism 16 is released and moved to the other end of pipe 14 preparatory for the next weld operation. As will be more fully described hereinafter, back-up pad apparatus 10 is brought into biased engagement with the inside surfaces of pipes 12 and 14 simultaneously with extension of clamp shoes 20 to support the weld.

Figure 2:
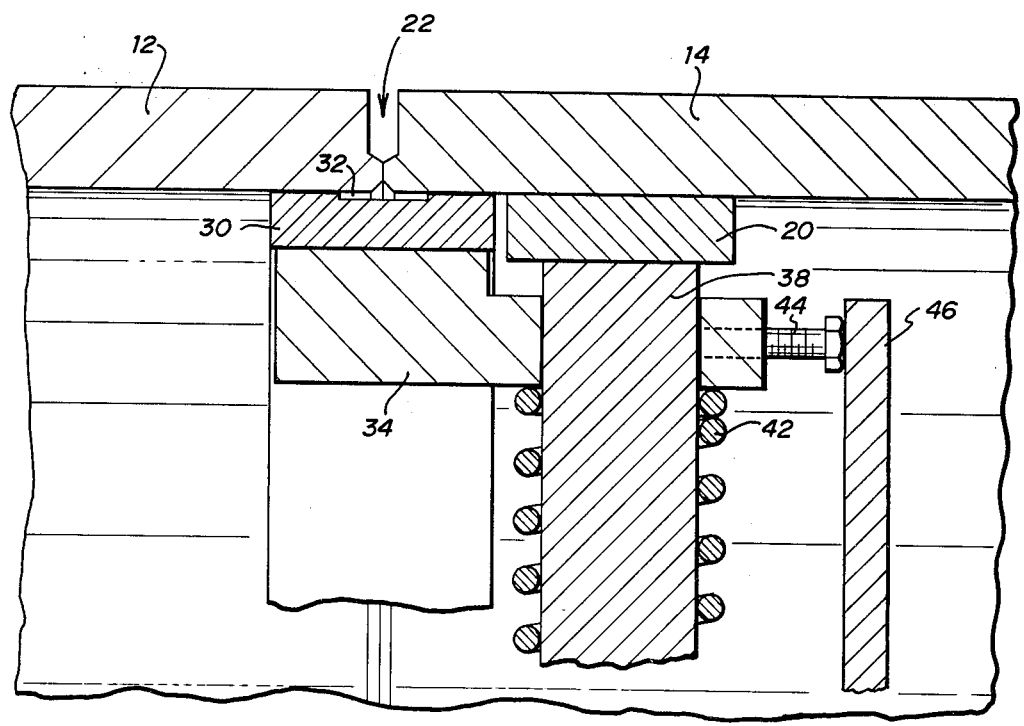
FIG. 2 is an enlarged partial section view taken along lines 2—2 of FIG. 3 in the direction of the arrows.
Figure 3:
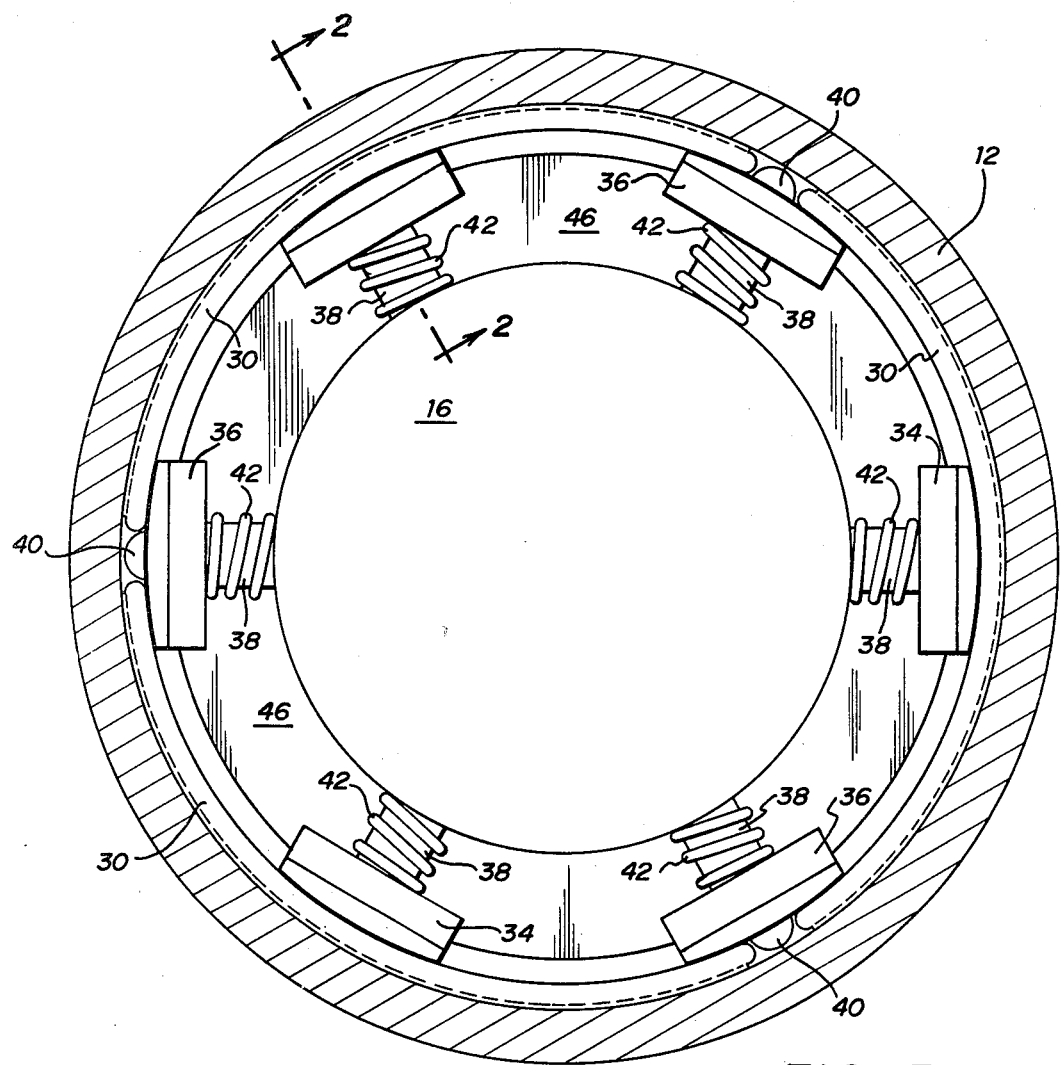
FIG. 3 is a complete enlarged side elevational view of the invention taken along lines 3—3 of FIG. 1 in the direction of the arrows.

FIG. 3 in conjunction with FIG. 2 shows construction details of back-up pad apparatus 10. Apparatus 10 comprises a plurality of arcuate pads 30 having curvatures corresponding to the inside surfaces of pipes 12 and 14. Each pad 30 comprises an arc defining a portion of the particular inside circumference of pipes 12 and 14. Each pad 30 has rounded ends as is best shown in FIG. 3, and a central groove 32 in the outside convex surface thereof as is best shown in FIG. 2. For example, each pad 30 can be approximately 1.5 inches wide and 0.375 inch thick, with groove 32 being 0.6 inch wide and 0.02 inch deep. Each pad 30 is preferably formed of a single piece of aluminum. Type 6061 T6 aluminum is preferably used, however other types such as 7075 aluminum or type 2024 aluminum can also be used if desired.

In a preferred embodiment of the invention, the pads 30 are finished with a hard anodizing process so that the surfaces are coated with approximately 2 mils of aluminum oxide. Hard anodizing with sulfuric acid at approximately 25 degrees F. in accordance with United States Military Specification No. 8625 has been found satisfactory. Such anodizing is performed by the Anodite Company, 711 West Hurst Boulevard, P. O. Box 547 of Hurst, Texas 76053.

It will be understood that the use of hard anodized aluminum for pads 30 is significant to the present invention. Such pads have been found to yield superior results when utilized as back-up pads. Back-up pads 30 formed in accordance with the invention exhibit greater tolerance to the high temperatures which accompany a welding operation, resulting in significantly extended part life. More importantly, the use of hard anodized aluminum for pads 30 eliminates contamination of the welded pipe joints, which enhances structural integrity of the pipeline.

Back-up pads 30 are supported on pad shoes 34 and 36 for radial movement relative to the pipes 12 and 14. Pad shoes 34 and 36 can be constructed of steel or aluminum. Pad shoes 34 and 36 are adapted to be slidably mounted on piston rods 38 of clamp shoes 20. The other ends of pad shoes 34 and 36 are configured to engage the underside of pads 30. Each pad 30 is mounted at the central portion thereof to a pad show 34. In accordance with the preferred construction, pads 30 are bolted to pad shoes 34 through the raised portions at the sides of grooves 32. It will thus be appreciated that pads are affixed to pad shoes 34 for movement therewith.

An intermediate shoe 36 is positioned radially inward and adjacent to the rounded ends of adjacent pads 30. For example, when utilizing three pads 30 of approximately 120 degrees each as in the preferred construction of the invention, three intermediate shoes 36 are also required. Each intermediate shoe 36 supports a semicylindrical member 40 secured thereto. Members 40 extend in a longitudinal direction parallel to the axis of the pipeline and are mounted so as to occupy space between ends of adjacent pads 30 as shown in FIG. 3. Intermediate shoes 36 are not, however, mechanically connected to back-up pads 30. It will be appreciated that the ends of adjacent pads 30 are slidably contacted on shoes 36.

Shoes 34 and 36 are biased outwardly by compression springs 42 surrounding the piston rods 38 of clamp shoes 20. Upon extension of clamp shoes 20, shoes 34 and 36 are simultaneously biased outwardly by springs 42. The back-up pads 30 are thus caused to make firm engagement with the inside cylindrical surfaces of pipes 12 and 14 in the region of the joint 22. With the back-up pads 30 thus positioned, the welding of joint 22 may occur. The weld may be installed manually by stick welding or automatically as described in U.S. Pat. Nos. 3,604,612 and 3,806,694. It will be appreciated that any molten weld material will be retained in the grooves 32 of back-up pads 30 to form a neat inside seam. In addition, the inside seam will be substantially uniform about the girth of the pipeline, except for the spaces between the ends of adjacent pads 30. However, the placement of semicylindrical members 40 between the rounded ends of pads 30 substantially fills this space to both localize and minimize the seam irregularities.

The rounded ends of pads 30 and the cylindrical surface of members 40 contribute to long life by lowering localized heating heretofore experienced with pads having sharp or abrupt changes in configuration.

After completion of the weld, back-up pads are retracted with retraction of clamp shoes 20. It will be appreciated that inward radial movement of pads 30 causes the ends thereof to draw closer. As they do so, they ride up on the cylindrical surface of members 40. This sliding movement occurs smoothly and naturally as a result of the rounded geometrics of the parts. Upon the next extension of shoes 34 and 36 the ends of pads 30 slide downward on the sides of cylindrical members 40 and draw apart again to the positions shown in FIG. 3. If desired, each back-up pad support shoe 34 and 36 can be provided with one or two adjustable screws similar to screw 44 shown in FIG. 2 for sliding contact with circular plate 46 to maintain proper alignment of pads 30 by preventing rotation thereof about piston rods 38.

Figure 4:
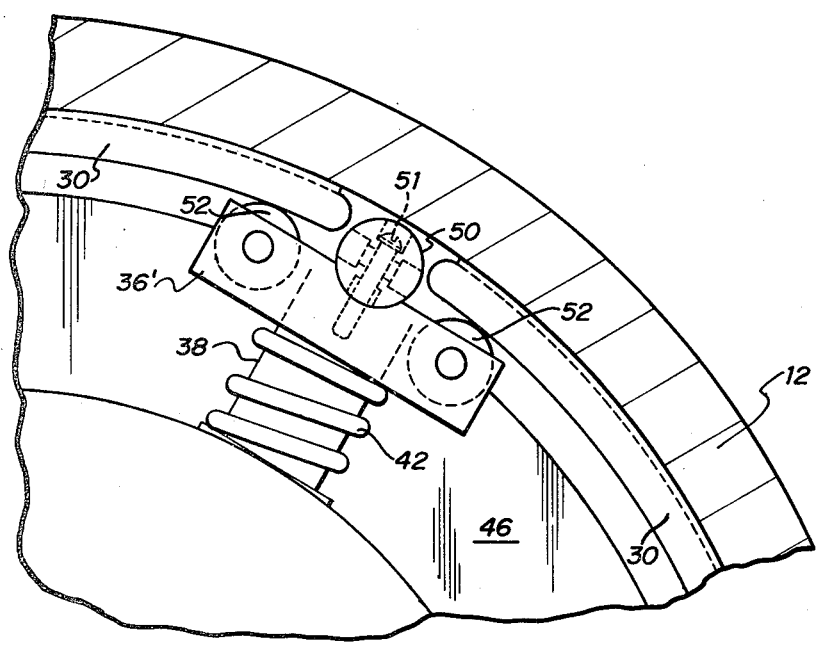
FIG. 4 is a side view of an alternate construction for the intermediate back-up pad support shoe.

Referring now to FIG. 4, there is shown a modification of back-up pad support shoe 36'. Shoe 36' utilizes a cylindrical member 50, as opposed to the semicylindrical member 40 of FIG. 3. In addition shoe 36' incorporates rollers 52 in place of the arcuate surfaces utilized by shoes 36. It will be apparent that the rounded ends of adjacent pads 30 are supported by rollers 52 of support shoe 36'. Shoe 36' can be constructed of steel or aluminum similar to that employed for pad shoes 34 and 36. Other than the use of cylindrical member 50 and roller 52, support shoe 36' functions similarly to support 36 hereinbefore described. Member 50 is secured to shoe 36' by suitable screws 51 extending through holes in member 50. Member 50 thus may be used in four different positions, resulting in life four times the life of the member 40, FIG. 3.

Figure 5:
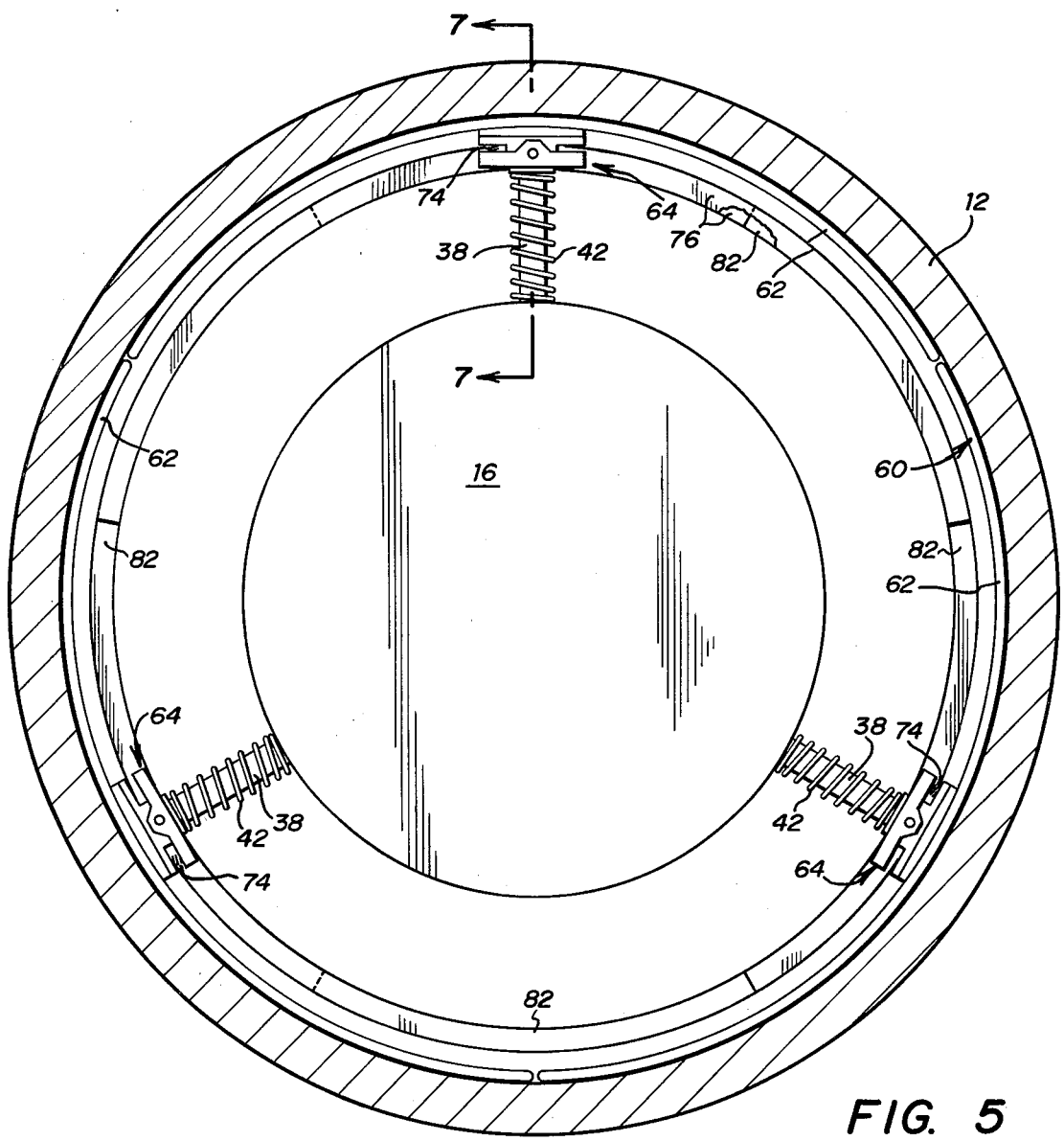
FIGS. 5 and 6 are side elevational views of another embodiment of the invention.
Figure 6:
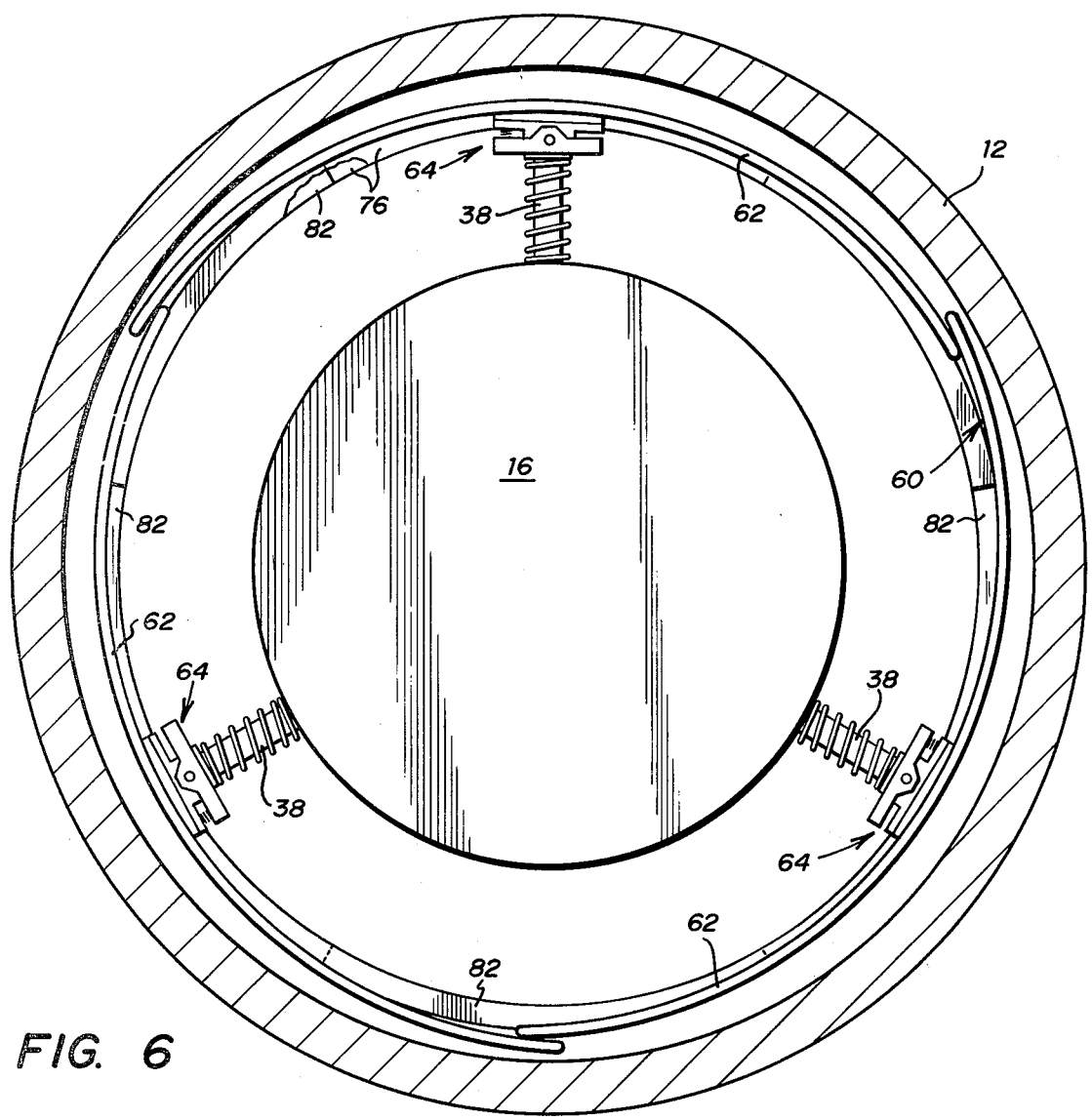

Referring now to FIGS. 5 and 6, there is shown an improved back-up pad apparatus 60 incorporating a second embodiment of the invention. The back-up pad apparatus 60 can be used with pipe aligning/clamping mechanism 16, instead of back-up pad apparatus 10 in the process of welding pipes 12 and 14 in end to end relationship. Back-up pad apparatus 60 is mounted for radial movement along piston rods 38 of clamp shoes 20 in mechanism 16. For clarity, the piston rods 38 not employed to support apparatus 60 have been omitted from FIGS. 5 and 6. As will be more fully described hereinafter, the primary distinction between apparatus 60 and apparatus 10 is the biased pivotal mounting of the individual back-up pads to achieve greater coverage of the inside circumferential seam while permitting noninterfering retraction.

Figure 7:
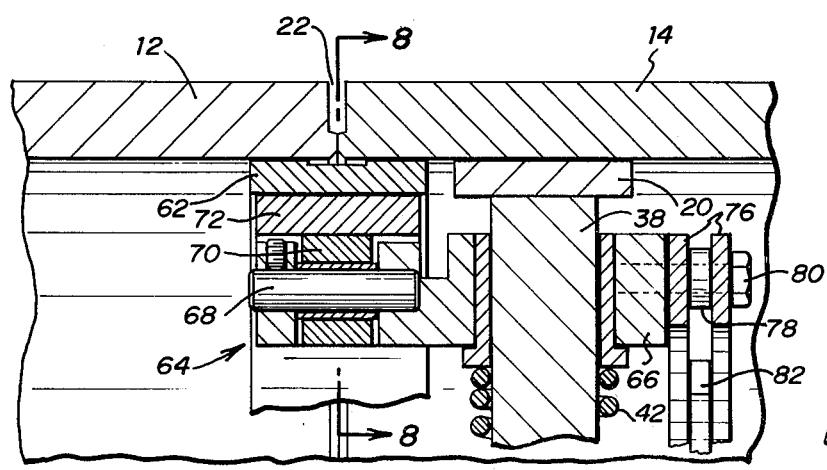
FIG. 7 is an enlarged partial section view taken along lines 7—7 of FIG. 5 in the direction of the arrows.
Figure 8:
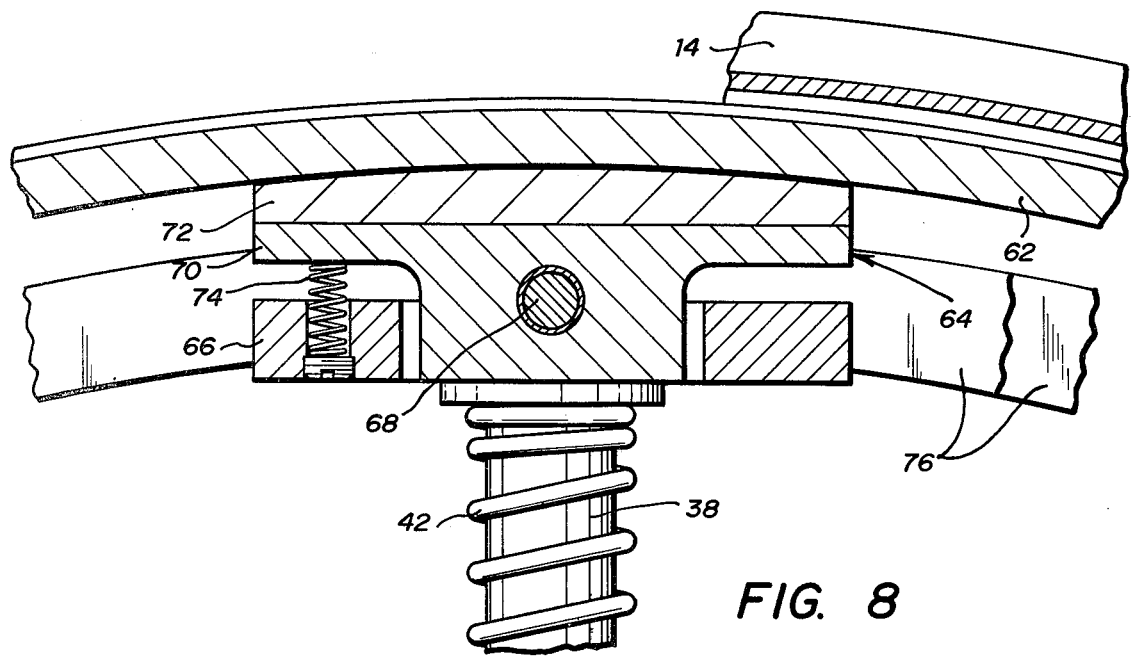
FIG. 8 is an enlarged partial section view taken along lines 8—8 of FIG. 7 in the direction of the arrows.

FIGS. 7 and 8 illustrate the constructional details of back-up pad apparatus 60. Apparatus 60 comprises a plurality of arcuate pads 62 similar to pads 30 hereinbefore described with reference to apparatus 10. As shown, three pads 62 of approximately 120 degrees each are employed in the preferred construction of apparatus 60. The convex surface of each pad 62 comprises an arc defining a portion of the inside circumference of pipes 12 and 14, and preferably has a lengthwise groove therein similar to pads 30. Each pad 62 is approximately rectangular in cross section and has rounded or semicylindrical ends. The back-up pads 62 are preferably formed of a single piece of aluminum, such as type 6061 T6 aluminum, and hard anodized per United States Military Specification No. 8625 in the manner hereinbefore described with reference to back-up pads 30 of apparatus 10.

Back-up pads 62 are supported on pad shoes 64 for radial movement relative to pipes 12 and 14. Each back-up pad 62 in apparatus 60 is mounted substantially centrally on a single support shoe 64. The support shoes 64 can be constructed of steel or aluminum similar to that used for pad shoes 34 and 36. Each support shoe 64 comprises a base plate 66 having a bushed hole and is slidably mounted on a piston rod 38 of a clamp shoe 20. Pin 68 interconnects a pivot plate 70 with each base plate 66. A cap member 72 is secured to the top of pivot plate 70, such as by means of screws (not shown). A back-up pad 62 in turn is screwed or bolted to each cap plate 72.

It will thus be appreciated that back-up pads 62 are pivotally supported by shoes 64 and mounted for movement therewith. Back-up pads 62 are pivotally biased about pins 68 by compression springs 74 provided between base plates 66 and pivot plates 70. The extent of pivotal action of pads 62 is, of course, limited by the relative sizes and geometrics of plates 66 and 70. The axes of pins 68 are substantially parallel to the centerline of the pipeline, and all back-up pads 62 are pivotally biased in the same direction about pins 68. The biased pivotal mounting of back-up pads 62 comprises a significant feature of apparatus 60.

Each support shoe 64 is biased radially outwardly by a compression spring 42 surrounding the piston rod 38 of a clamp shoe 20. The piston rods 38 of mechanism 16 not supporting a shoe 64 are not shown in FIGS. 5 and 6 for clarity. Upon extension of clamp shoes 20, support shoes 64 are simultaneously biased outwardly. The back-up pads 62 are thus brought into firm engagement with the inside surfaces of pipes 12 and 14 in the region of joint 22. In the outward position, back-up pads 62 are positioned as shown in FIG. 5 with the ends of adjacent pads nearly touching. Except for the relatively small gaps between adjacent pads 62, it will be apparent that substantially the entire inside circumference of joint 22 is supported by back-up pad apparatus 60. With apparatus 60 thus positioned, the external welding of joint 22 can proceed either manually, or automatically as described in U.S. Pat. Nos. 3,604,612 and 3,806,694.

A clean inside seam, with the exception of very small irregularities at the locations of adjacent ends of back-up pads 62, will thus be formed about the girth of the pipeline. In addition, the rounded or semicylindrical configurations of the ends of back-up pads 62 contribute to longer part life by lowering localized heating heretofore experienced with pads having sharp or abrupt changes in configuration.

After completion of the weld, back-up pads 62 are withdrawn upon retraction of clamp shoes 20. Pads 62 are pivoted about pins 68 by springs 74 as clamp shoes 20 are drawn inward. Initially, one end of each pad 62 remains engaged with the inside circumference of pipes 12 and 14. Because the back-up pads 62 are all biased in the same direction, the ends of adjacent pads are moved in opposite directions upon further retraction of clamp shoes 20 so that one rides over the top of another as shown in FIG. 6. The biased pivotal mounting of back-up pads 62 thus permits retraction without interference and affords maximum coverage of the inside circumference of the joint between the pipes. After retraction of clamp shoes 20 and back-up pad apparatus 60, mechanism 16 can be released and moved to the other end of the pipe for the next welding operation.

Preferably, the back-up pad apparatus 60 is constructed to prevent rotation of pads 62 about piston rods 38. As is best shown in FIG. 7, a pair of alignment plates 76 separated by spacer 78 are attached by at least one bolt 80 to one base plate 66 of apparatus 60. A single alignment plate 82 is attached to the remaining two base plates 66 of apparatus 60. Plates 76 and 82 are generally arcuate and lie in planes perpendicular to the centerline of pipes 12 and 14, with the ends of plates 82 being received between plates 76. It will be apparent that during extension and retraction, back-up pads 62 are maintained in alignment by sliding contact between plates 76 and 82. When utilizing four pads 62, a pair of spaced apart plates 76 are secured to every other pad 62, with single plates 82 being secured to the other pads. If there are a sufficient number of pads 62, single plates 82 on each pad and overlapping in and out at the ends will prevent rotation of the pads in either direction about piston rods 38.

In view of the foregoing it will be apparent that the present invention comprises an improved back-up pad for welding which incorporates numerous advantages over the prior art. Superior life and coverage of the joints being welded are but two benefits of the invention. Other advantages derived from the use of the invention will readily suggest themselves to those skilled in the art.

Although preferred embodiments of the invention have been illustrated in the accompanying drawings and described in the foregoing detailed description, it will be understood that the invention is not limited to the embodiments disclosed, but is intended to embrace any alternatives, modifications, and rearrangements and/or substitutions of parts or elements as fall within the spirit and scope of the invention.

I claim:

1. A back-up pad apparatus for use in externally welding a joint between ends of pipes in a pipeline, which comprises:

a plurality of arcuate back-up pads having curvatures complementary with the interior surfaces of the pipes to substantially span the inside circumference of the joint;

support shoe means connected to each of said back-up pads intermediate the ends thereof and pivotally supporting said pads for radial movement into and out of engagement with the interior surfaces of said pipes at the joint;

means for biasing each of said back-up pads for pivotal movement in the same direction; and means for selectively effecting radial movement of said support shoe means and the back-up pads supported thereon.

2. The apparatus of claim 1 wherein each back-up pad is constructed of hard anodized aluminum material.

3. The apparatus of claim 1 wherein each of said support shoe means is resiliently biased outwardly.

4. The apparatus of claim 1 wherein each of said support shoe means comprises:
a base plate mounted for sliding radial movement; and
a pivot plate affixed to the respective back-up pad and pivotally secured to said base plate for limited rotation about an axis substantially parallel with the centerline of the pipeline.

5. The apparatus according to claim 4 wherein the means for pivotally biasing said back-up pads comprises at least one spring positioned between each base plate and respective pivot plate.

6. The apparatus of claim 1 wherein the ends of the back-up pads are rounded so that the ends of adjacent pads pivot and slide relative to each other without interference upon retraction of said pads.

7. A back-up pad apparatus for use in externally welding the joint between ends of pipes in a pipeline having a centerline, and which is particularly suited for use with a pipe clamping mechanism having a plurality of clamp shoes selectively actuated in radial directions by piston rods into and out of clamping engagement with the inside surfaces of the pipes, said apparatus comprising:
a plurality of back-up pads arranged end to end and circularly with each pad defining a segment of an arc complementary with the inside surfaces of the pipes;
said back-up pads being sufficiently wide to substantially span the joint, and having substantially semi-cylindrical ends;
support shoe means slidably mounted on certain ones of said piston rods for pivotally supporting each of said back-up pads for radial movement and for rotation about axes substantially parallel with the centerline of the pipeline;
means for individually biasing said back-up pads for pivotal movement in the same direction; and
means for resiliently biasing said support shoe means outwardly so that the back-up pads are moved into and out of engagement with the inside surfaces of said pipes at the joint responsive to actuation of the pipe clamp shoes.

8. The apparatus of claim 7 wherein each back-up pad is constructed of hard anodized aluminum material.

9. The apparatus of claim 7 wherein each of said support shoe means comprises:
a base plate mounted for sliding movement on one of said piston rods; and
a pivot plate affixed to the respective back-up pad and pivotally secured to said base plate for limited rotation about an axis substantially parallel with the centerline of the pipeline;
said pivotal biasing means comprising at least one spring positioned between said base and pivot plates.

10. The apparatus of claim 7, further including:
alignment plate means secured to each of the support shoe means and engaging each other for preventing rotation of the back-up pads and support shoe means about the piston rods.

11. The apparatus according to claim 10, wherein the alignment plate means comprises:
a pair of spaced apart arcuate plates secured to said support shoe means; and
a single arcuate plate secured to and received between adjacent pairs of said spaced apart plates.

* * * * *